United States Patent [19]
Weder

[11] Patent Number: 5,891,286
[45] Date of Patent: Apr. 6, 1999

[54] METHOD OF FORMING CURLED OR CRIMPED DECORATIVE ELEMENTS HAVING AN OPTICAL EFFECT

[75] Inventor: Donald E. Weder, Highland, Ill.

[73] Assignee: Southpac Trust International Inc.

[21] Appl. No.: 796,182

[22] Filed: Feb. 7, 1997

Related U.S. Application Data

[63] Continuation of Ser. No. 245,094, May 17, 1994, abandoned, which is a continuation-in-part of Ser. No. 179,057, Jan. 7, 1994, Pat. No. 5,576,089.

[51] Int. Cl.$^6$ .............................. B32B 31/04; B32B 31/18
[52] U.S. Cl. ........................... 156/163; 156/229; 156/250
[58] Field of Search .............................. 156/61, 163, 229, 156/250

[56] References Cited

U.S. PATENT DOCUMENTS

| | | |
|---|---|---|
| 31,780 | 12/1861 | Cooper et al. . |
| 2,240,072 | 4/1941 | Hodgdon et al. . |
| 2,244,845 | 6/1941 | Matthews . |
| 2,774,187 | 12/1956 | Smithers . |
| 2,989,828 | 6/1961 | Warp . |
| 3,094,810 | 6/1963 | Kalpin . |
| 3,150,031 | 9/1964 | Powell . |
| 3,231,645 | 1/1966 | Bolomey . |
| 3,376,666 | 4/1968 | Leonard . |
| 3,400,036 | 9/1968 | Hemrick et al. . |
| 3,431,706 | 3/1969 | Stuck . |
| 3,475,191 | 10/1969 | Lodge et al. . |
| 3,481,663 | 12/1969 | Greenstein . |
| 3,549,405 | 12/1970 | Schrenk et al. . |
| 3,554,434 | 1/1971 | Anderson . |
| 3,616,192 | 10/1971 | Sinclair et al. . |
| 3,673,060 | 6/1972 | Murphy et al. .................... 156/220 |
| 3,749,629 | 7/1973 | Andrews et al. . |
| 3,865,664 | 2/1975 | Neumann . |
| 3,898,117 | 8/1975 | Taylor . |
| 3,922,440 | 11/1975 | Wegwerth et al. . |
| 3,962,503 | 6/1976 | Crawford . |
| 4,162,343 | 7/1979 | Wilcox et al. . |
| 4,189,868 | 2/1980 | Tymchuck et al. . |
| 4,333,267 | 6/1982 | Witte . |
| 4,400,910 | 8/1983 | Koudstaal et al. . |
| 4,413,725 | 11/1983 | Bruno et al. . |
| 4,520,064 | 5/1985 | Contemporary, Inc. . |
| 4,530,863 | 7/1985 | Seeger . |
| 4,699,820 | 10/1987 | Herr, Jr. et al. . |
| 4,735,669 | 4/1988 | Guida et al. . |
| 4,773,182 | 9/1988 | Weder et al. ............................... 47/66 |
| 4,786,533 | 11/1988 | Crass et al. . |
| 4,801,014 | 1/1989 | Meadows . |
| 4,963,218 | 10/1990 | Rainey . |
| 5,008,143 | 4/1991 | Armanini . |
| 5,020,672 | 6/1991 | Watts . |
| 5,088,972 | 2/1992 | Parker ....................................... 493/52 |
| 5,089,318 | 2/1992 | Shetty et al. . |
| 5,147,706 | 9/1992 | Kingman . |
| 5,154,765 | 10/1992 | Armanini . |
| 5,204,160 | 4/1993 | Rouser . |
| 5,228,234 | 7/1993 | deKlerk et al. . |
| 5,235,782 | 8/1993 | Landau . |

FOREIGN PATENT DOCUMENTS

| | | |
|---|---|---|
| 1166697 | 3/1964 | Germany . |
| 1204647 | 9/1970 | United Kingdom . |

OTHER PUBLICATIONS

Mearl Iridescent Films, General Information, The Mearl Corporation, pp. 1–6, Jun. 1981.
Simple Solution For those Peak vol. Periods, Speed Cover® 1989©, 6 p. Highland Supply, Highland, Il.
Speed Sheets® & Speed Rolls, ©1990, 2 pgs, Highland Supply Corp. Highland, IL.
LePlant SAC Advertisement, published prior to Sep. 26, 1987.

*Primary Examiner*—Richard Crispino
*Attorney, Agent, or Firm*—Dunlap, Codding & Rogers, P.C.

[57] ABSTRACT

Methods of forming decorative elements such as decorative grass and glitter possessing a unique optical effect from a laminated sheet of optical effect material. The decorative elements have a curl or a crimp set therein to enhance the light-reflecting characteristics of the decorative elements and to provide greater volume of the decorative elements for a given weight of decorative elements.

9 Claims, 4 Drawing Sheets

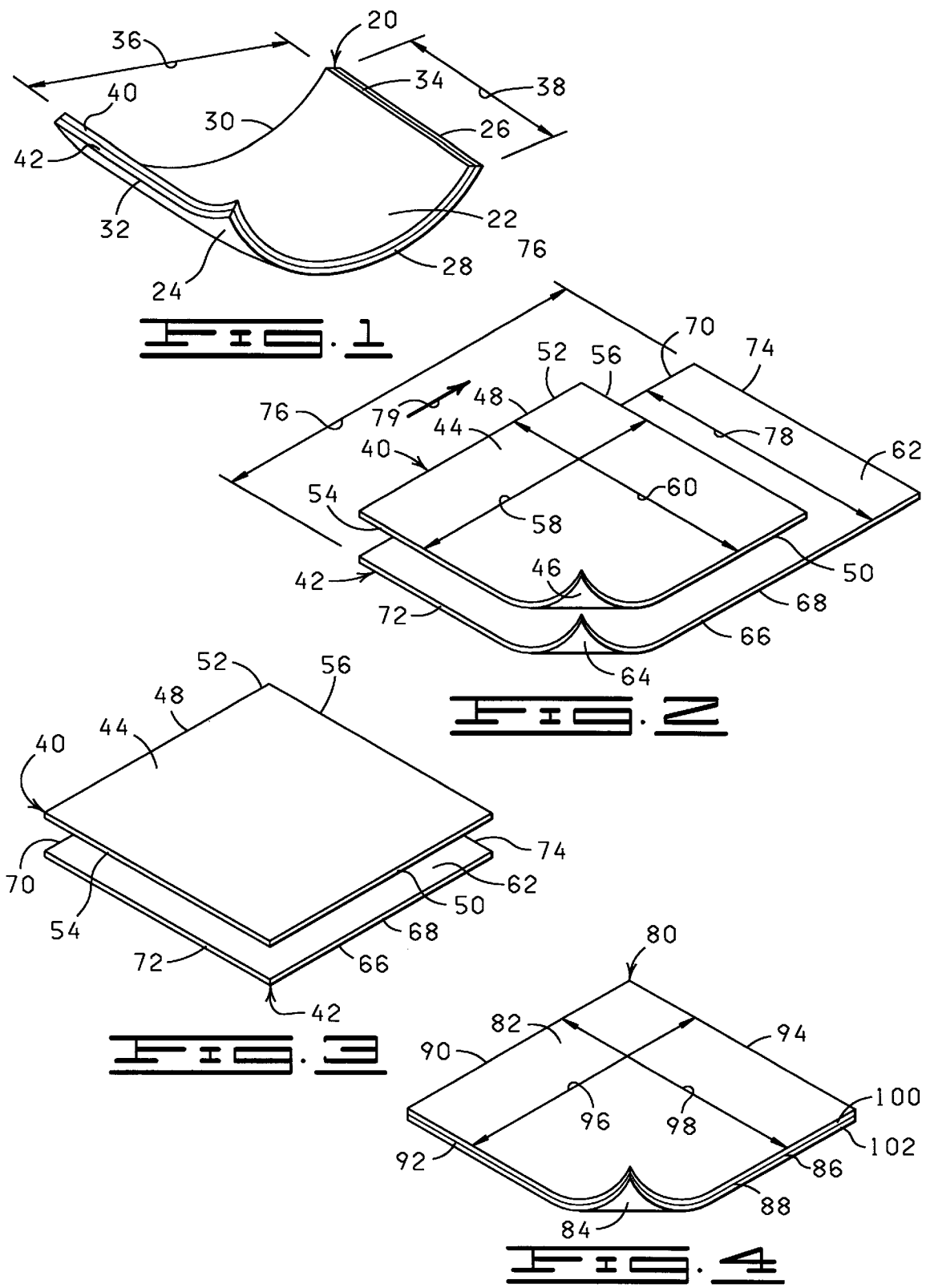

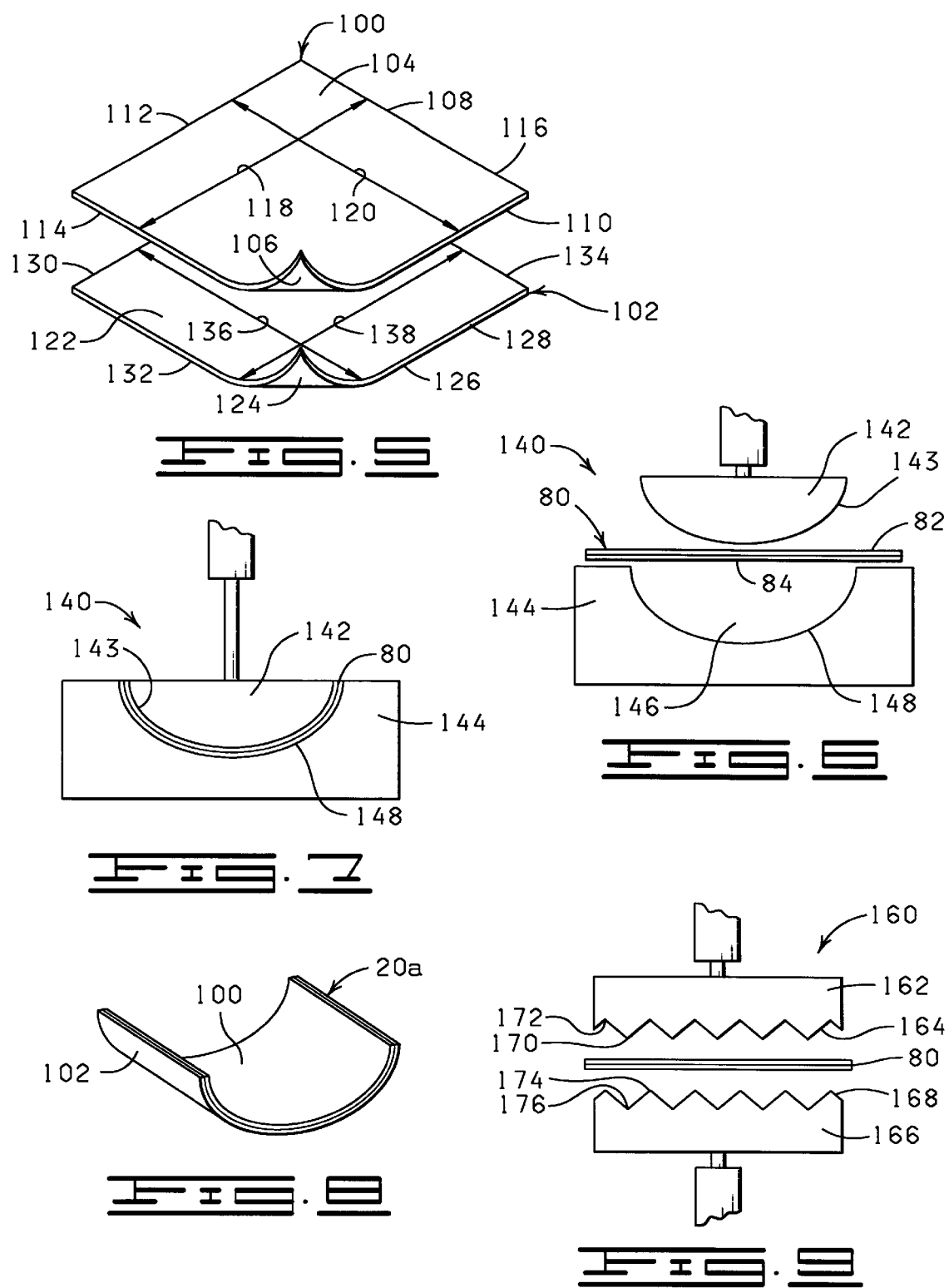

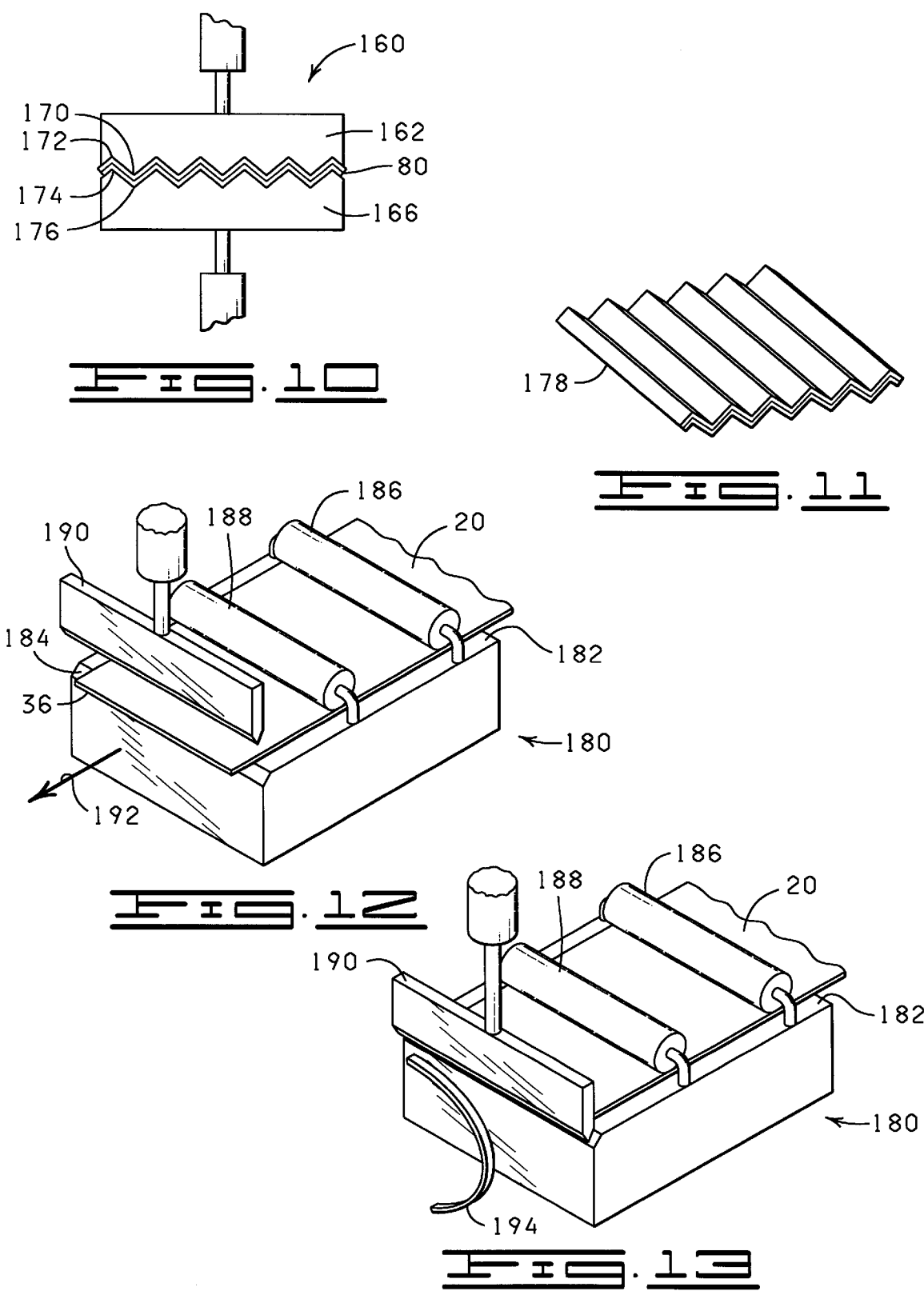

METHOD OF FORMING CURLED OR CRIMPED DECORATIVE ELEMENTS HAVING AN OPTICAL EFFECT

CROSS REFERENCE TO RELATED APPLICATIONS

This application is a continuation of U.S. Ser. No. 08/245,094, filed May 17, 1994, entitled METHODS OF FORMING CURLED OR CRIMPED DECORATIVE ELEMENTS HAVING AN OPTICAL EFFECT, abandoned; which is a continuation-in-part of U.S. Ser. No. 08/179,057, filed Jan. 7, 1994, entitled OPTICAL EFFECT MATERIAL AND METHODS, now U.S. Pat. No. 5,576,089.

FIELD OF THE INVENTION

The present invention relates to methods of forming decorative elements such as decorative grass and glitter. More particularly, the present invention relates to methods of forming decorative grass and glitter having an optical effect and having curls or crimps formed therein.

BRIEF DESCRIPTION OF THE DRAWINGS

FIG. 1 is a perspective view of a curled laminated sheet of optical effect material.

FIG. 2 is a perspective view of a first sheet of material and a second sheet of material, the first sheet of material being shorter in length than the second sheet of material.

FIG. 3 is a perspective view of the sheets of material of FIG. 2 showing the first sheet of material in a stretched position wherein the length of the first sheet of material substantially equals the length of the second sheet of material.

FIG. 4 is a perspective view of a flat laminated sheet of optical effect material.

FIG. 5 is a perspective view of a first sheet of material and a second sheet of material.

FIG. 6 is a side elevational view of a curl forming die in a retracted position.

FIG. 7 is a side elevational view of the curl forming die of FIG. 6 showing the flat laminated sheet of optical effect material of FIG. 4 disposed in the curl forming die when the curl forming die is in an extended position.

FIG. 8 is a perspective view of a curled laminated sheet of optical effect material.

FIG. 9 is a side elevational view of a crimp forming die in a retracted position.

FIG. 10 is a side elevational view of the crimp forming die of FIG. 9 showing the flat laminated sheet of optical effect material of FIG. 4 disposed in the crimp forming die when the crimp forming die is in an extended position.

FIG. 11 is a perspective view of a crimped laminated sheet of optical effect material.

FIG. 12 is a perspective view of a curled laminated sheet of optical effect material disposed on a cutting apparatus.

FIG. 13 is a perspective view of the curled laminated sheet of optical effect material and cutting apparatus of FIG. 12 showing the cutting element of the cutting apparatus in an extended position whereby a piece of curled decorative grass having an optical effect is cut from the curled laminated sheet of optical effect material.

BACKGROUND OF THE INVENTION

Figure 14:
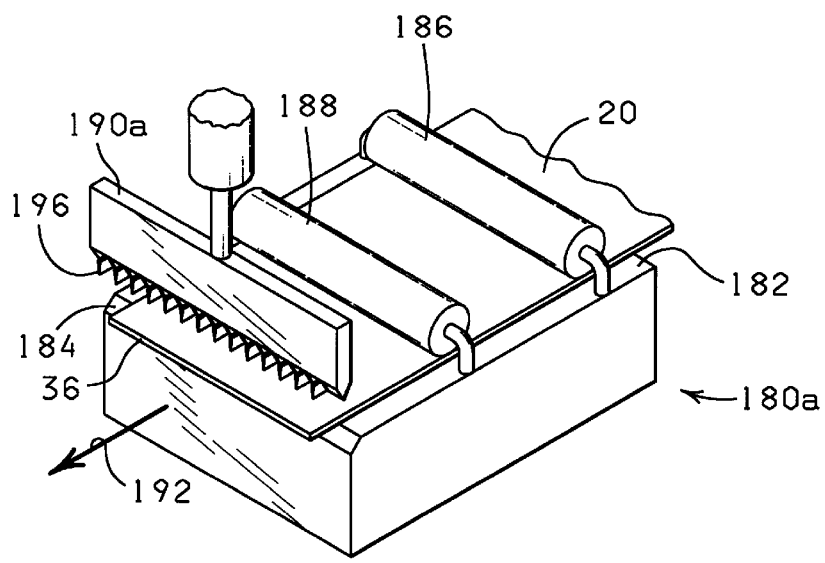
FIG. 14 is a perspective view of a curled laminated sheet of optical effect material on a modified cutting apparatus.

Decorative elements, such as decorative grass and glitter, are frequently used to decorate a variety of items. For example, decorative grass is used in virtually all Easter baskets to enhance the visual aesthetics of the baskets by providing color and glimmering qualities to the arrangement. Glitter may be added to a multitude of items such as clothing or paper to provide a sparkling, light-reflecting aspect to the item.

Decorative grass and glitter are typically formed by cutting specific shapes from sheet material. In the case of decorative grass, these shapes are usually long, thin filaments of the sheet material.

Regarding glitter, the shapes are typically very small squares or rectangles, though the shapes may sometimes comprise circles, stars or other geometric or abstract shapes. As used herein, the term "glitter" also refers to material commonly known as confetti, sequins or flakes.

Plastic film is a material commonly used in producing such decorative elements. As used herein "plastic film" refers to any synthetic polymer film such as a polypropylene film or a naturally occurring polymer such as cellophane. A plastic film, as contemplated and described in detail hereinafter, is relatively strong and not as subject to tearing as might be the case with paper or foil. Other materials which may be used to produce decorative elements include paper, metallized film, or any combination of plastic, paper or metallized film.

One of the most desirable features of decorative grass and glitter is a light-reflecting characteristic. Therefore, it is highly desirable to produce such decorative elements in a manner that maximizes the light-reflecting properties of the decorative elements.

Additionally, since these items are frequently sold by volume, a method of manufacturing decorative elements which adds volume to the packaged decorative elements without adding mass or weight is desirable in that such a method would make manufacturing a given volume of decorative elements less expensive. Similarly, the same weight of packaged decorative elements could be packaged to appear to contain a greater amount than the same weight of a competing product, thereby resulting in higher sales for the manufacturer.

Methods of manufacturing decorative elements which enhance their light-reflecting qualities are known in the art. One of these methods is described and claimed in copending application U.S. Ser. No. 08/179,057 entitled "Optical Effect Material And Methods" which is expressly incorporated herein by reference. The referenced method involves combining sheets of material having different optical qualities to form one sheet of material having unique optical qualities. However, the method disclosed in the referenced application does not recognize or envision producing decorative elements having such unique optical characteristics while at the same time increasing the volume of such elements without adding weight.

Conversely, methods of producing decorative elements which add volume to the packaged product without adding weight are known in the art, but these methods do not utilize the unique optical effect material as described above. These methods typically form the sheet-like material by extrusion of a polymer material. The resulting sheet material is stretched, while heated, and the stretched material is then cut into decorative elements (such as decorative grass) having a curl. This curl in the decorative elements allow the appearance of a given weight of packaged product to appear "fluffed" or as having a greater volume than a similar weight of decorative elements formed without a curl. Unfortunately, this method cannot be used with the optical effect material described above.

The present invention contemplates a method for producing decorative elements such as decorative grass and glitter from optical effect material wherein the decorative elements appear to have an increased volume without adding weight. The method involves combining two separate sheets of material to form one sheet of optical effect material having a curl or a crimp therein. The optical effect material is then cut to produce decorative elements having the aforementioned desired qualities.

DESCRIPTION OF THE PREFERRED EMBODIMENTS

Shown in FIG. 1 is a laminated sheet of optical effect material having a distortion set therein, generally indicated by the reference numeral 20. The distortion comprises a curl but, as will be described in more detail hereinafter, the distortion may also comprise at least one crimp. The laminated sheet of optical effect material 20 has a first surface 22, a second surface 24 and an outer periphery 26. The outer periphery 26 comprises a first side 28, a second side 30, a first end 32 and a second end 34. The sheet of optical effect material 20 further comprises a length 36 and a width 38, the length being the distance between the first and second ends 32 and 34 of the sheet of optical effect material 20, and the width being the distance between the first and second sides 28 and 30 of the sheet of optical effect material 20.

The sheet of optical effect material 20 comprises a first sheet of material 40 (FIG. 2) and a second sheet of material 42. The first sheet of material 40 has a first surface 44, a second surface 46 and an outer periphery 48. The outer periphery 48 comprises a first side 50, a second side 52, a first end 54 and a second end 56. The first sheet of material 40 further comprises a length 58 and a width 60, the length 58 being the distance between the first and second ends 54 and 56 of the first sheet of material 40, and the width 60 being the distance between the first and second sides 50 and 52 of the first sheet of material 40.

Similarly, the second sheet of material 42 has a first surface 62, a second surface 64 and an outer periphery 66. The outer periphery 66 comprises a first side 68, a second side 70, a first end 72 and a second end 74. The second sheet of material 42 further comprises a length 76 and a width 78, the length 76 being the distance between the first and second ends 72 and 74 of the second sheet of material 42, and the width 78 being the distance between the first and second sides 68 and 70 of the second sheet of material 42.

The first sheet of material 40 is constructed from any suitable material that is capable of transmitting light to the second sheet of material 42 when the first sheet of material 40 is laminated to the second sheet of material 42. Additionally, the first sheet of material 40 must be capable of transmitting light reflected from the second sheet of material 42. Further, the first sheet of material 40 must be suitable for making decorative elements such as decorative grass, glitter and the like.

The first sheet of material 40 has a thickness in a range from about 0.1 mils to about 10 mils. Preferably, the first sheet of material 40 has a thickness in a range from about 0.4 mils to about 0.9 mils. The first sheet of material 40 may be constructed of a single layer of material or a plurality of layers of the same or different types of materials. The layers of material comprising the first sheet of material 40 may be laminated together by any method known in the art.

While any suitable material having the above described properties can be employed as the first sheet of material 40 of the sheet of optical effect material 20, desirable results can be obtained wherein the first sheet of material 40 comprises a plastic film such as Vifan BT medium slip biaxially oriented polypropylene film (clear) having a thickness in a range from about 0.4 mil to about 0.9 mil, available from Vifan Canada, Inc., Vifan Street, Lanoraie d'Autray, Quebec, Canada J0K 1E0.

Although the first sheet of material 40 shown in FIGS. 1–3 is rectangular in shape, it is to be understood that the first sheet of material 40 can be provided with any shape or configuration that is suitable for the purposes described herein. For example, but not by way of limitation, the first sheet of material 40 may be square, rectangular or circular or the first sheet of material 40 may be of any other geometric or abstract shape.

The second sheet of material 42 is constructed from any suitable material that is substantially iridescent, i.e., the material demonstrates a play of lustrous, changing colors. In addition, the second sheet of material 42 must be suitable for making decorative elements such as decorative grass, glitter and the like.

The second sheet of material 42 has a thickness in a range from about 0.1 mils to about 10 mils, and the second sheet of material 42 may be constructed from plastic, metal, paper or any combination thereof. Preferably, the second sheet of material 42 has a thickness in a range from about 0.4 mils to about 0.9 mils. The second sheet of material 42 may be constructed of a single layer of material or a plurality of layers of the same or different types of materials. The layers of material comprising the second sheet of material 42 may be laminated together by any method known in the art.

While any suitable material having the above described properties can be employed as the second sheet of material 42 of the optical effect material 20, desirable results can be obtained wherein the second sheet of material 42 is an iridescent film is manufactured by Mearl Corporation, 1050 Lower South Street, Peekskill, N.Y., 10566, under the trademark IF-8531 R/S, having a thickness in a range from about 0.4 mil to about 0.9 mil.

Although the second sheet of material 42 shown in FIGS. 1–3 is rectangular in shape, the second sheet of material 42 can be provided with any shape or configuration that is suitable for the purposes described herein. For example, but not by way of limitation, the second sheet of material 42 may be square, rectangular or circular or the second sheet of material 42 may be of any other geometric or abstract shape. However, it is desirable that the second sheet of material 42 have substantially the same shape as the first sheet of material 42.

As will be explained in greater detail hereinafter, the preferred method for providing a curled sheet of optical effect material 20 in accordance with the present invention requires that one of the first or second sheets of material 40 or 42 be of smaller size than the other. It is desirable that only one dimension of the first or second sheet of material is smaller than the corresponding dimension of the other sheet.

As depicted in FIG. 2, the first sheet of material 40 is sized smaller than the second sheet of material 42. In particular, the length 58 of the first sheet of material 40 is shorter than the length 76 of the second sheet of material 42. However, it should be understood that, if desired, the width 60 of the first sheet of material 40 could be of different dimension than the width 78 of the second sheet of material 42. Also, the length 58 and the width 60 of the first sheet of material 40 could be of different measure than the length 76 and the width 78 of the second sheet of material 42.

As shown in FIG. 2, the first sheet of material 40 is disposed adjacent the second sheet of material 42 so that the second surface 46 of the first sheet of material 40 is disposed adjacent the first surface 64 of the second sheet of material 42. The first end 54 of the first sheet of material 40 is aligned with the first end 72 of the second sheet of material 42. The first and second sides 50 and 52 of the first sheet of material 40 are aligned, respectively, with the first and second sides 68 and 70 of the second sheet of material 42.

The first sheet of material 40 is then stretched in direction 79 (FIG. 3) until the length 58 of the first sheet of material 40 is approximately equal to the length 76 of the second sheet of material 42. In the stretched condition of the first sheet of material 40, the size of the first sheet of material 40 should approximate the size of the second sheet of material 42 and the outer periphery 48 of the first sheet of material 40 should be substantially aligned with the outer periphery 66 of the second sheet of material 42.

With the first sheet of material 40 in the stretched condition so that the first and second sheets of material 40 and 42 are in substantial alignment, the second surface 46 of the first sheet of material 40 is brought into contact with the first surface 62 of the second sheet of material 42. The first and second sheets of material 40 and 42 are then laminated together by any method known in the art. By laminating the first sheet of material 40 to the second sheet of material 42 while the first sheet of material 40 is in the stretched condition, the first sheet of material 40 creates a recoil tension wherein the length 58 of the first sheet of material 40 tends to return to its original dimension. This action causes the curled laminated optical effect material 20 produced by laminating the first and second sheets of material 40 and 42 to curl in the direction of the first sheet of material 40 substantially as shown in FIG. 1.

Depicted in FIGS. 4–11 is an alternate method of providing a laminated sheet of optical effect material 80 having a distortion, such as a curl or a crimp, set therein. FIGS. 4–8 show a method of setting a curl in the laminated sheet of optical effect material 80 and FIGS. 9–11 show how a crimp may be set in the laminated sheet of optical effect material 80.

Referring more specifically to FIG. 4, the laminated sheet of optical effect material 80 is similar to that of FIG. 1 except that the laminated sheet of optical effect material 80 does not have a distortion set therein. The laminated sheet of optical effect material 80 has a first surface 82, a second surface 84 and an outer periphery 86. The outer periphery 86 comprises a first side 88, a second side 90, a first end 92 and a second end 94. The laminated sheet of optical effect material 80 further comprises a length 96 and a width 90, the length 96 being the distance between the first and second ends 90 and 92 of the sheet of optical effect material 80, and the width 98 being the distance between the first and second sides 88 and 90 of the sheet of optical effect material 80.

The laminated sheet of optical effect material 80 comprises a first sheet of material 100 (FIG. 5) and a second sheet of material 102. The first sheet of material 100 has a first surface 104, a second surface 106 and an outer periphery 108. The outer periphery 108 comprises a first side 110, a second side 112, a first end 114 and a second end 116. The first sheet of material 100 further comprises a length 118 and a width 120, the length 118 being the distance between the first and second ends 114 and 116 of the first sheet of material 100, and the width 120 being the distance between the first and second sides 110 and 112 of the first sheet of material 100.

Similarly, the second sheet of material 102 has a first surface 122, a second surface 124 and an outer periphery 126. The outer periphery 126 comprises a first side 128, a second side 130, a first end 132 and a second end 134. The second sheet of material 102 further comprises a length 136 and a width 138, the length 136 being the distance between the first and second ends 132 and 134 of the second sheet of material 102, and the width 138 being the distance between the first and second sides 128 and 130 of the second sheet of material 102.

The first sheet of material 100 is constructed from the same materials and in the same manner as the first sheet of material 40 of FIGS. 1–3 as shown and described previously. The second sheet of material 102 is constructed from the same materials and in the same manner as the second sheet of material 42 of FIGS. 1–3 as shown and described previously.

As shown in FIG. 5, the first sheet of material 102 and the second sheet of material 104 are sized to be of similar dimensions, that is, the lengths 118 and 136 and the widths 120 and 138 of the first and second sheets of material 102 and 104 are approximately equal. The outer periphery 108 of the first sheet of material 100 is aligned with the outer periphery 126 of second sheet of material 102. The second surface 106 of the first sheet of material 100 is disposed adjacent the first surface 122 of the second sheet of material 102 and then brought into contact with the first surface 122 of the second sheet of material 102. The first and second sheets of material 100 and 102 are then laminated by any method known in the art.

The resultant laminated sheet of optical effect material 80 (FIG. 4) is substantially flat since neither the first nor the second sheet of material 100 or 102 was stretched before lamination. At this point, a distortion, such as a curl or a crimp, may be set in the laminated sheet of optical effect material 80 by contacting one of the first or second surfaces 82 and 84 of the laminated sheet of optical effect material 80 with a surface capable of providing a curl or a crimp in the laminated sheet of optical effect material 80.

Shown in FIG. 6 is the laminated sheet of optical effect material 40 of FIG. 4 disposed in a die 140, the die 140 comprising a first or male die portion 142 having a convex surface 143, and a second or female die portion 144 having a cavity 146 with a concave surface 148 (it will be appreciated that the die is represented schematically in the drawings). The first die portion 142 fits within the cavity 146 of the second die portion 144 and is selectively moveable between a retracted position (FIG. 6) wherein the first die portion 142 and the second die portion 144 are spatially separated and an extended position (FIG. 7) wherein the first die portion 142 is disposed within the cavity 146 of the second die portion 144.

The laminated sheet of optical effect material 80 is placed between the first die portion 142 and the second die portion 144 when the first die portion 142 is in the retracted position substantially as shown in FIG. 6. When the first die portion 142 is thereafter moved to the extended position, the convex surface 143 of the first die portion 142 comes into contact with either the first or the second surface 82 or 84 of the laminated sheet of optical effect material 80, depending on whether the first surface 82 or the second surface 84 of the laminated sheet of optical effect material 80 is facing the first die portion 142 when the laminated sheet of optical effect material 80 is placed between the first die portion 142 and the second die portion 144.

As the first die portion 142 continues to extend, the laminated sheet of optical material 80 is distorted, or curled, to conform to the shape of the convex surface 143 of the first die portion 142. Sufficient pressure is applied to the laminated sheet of optical effect material 80 so that, when the first die portion 142 is moved to the retracted position, the laminated sheet of optical material 80 retains the curl after it has been removed from the die 140. This provides the curled laminated sheet of optical effect material 20a shown in FIG. 8.

Although the method shown contemplates using a die 140 to curl the laminated sheet of optical effect material 80, any method known in the art may be used to accomplish the same result. For example, in another embodiment (not shown), the laminated sheet of optical effect material 80 is contacted with a surface (not shown) such as an edge or a roller capable of producing a curl in the laminated sheet of optical effect material 80. The surface contacts either the first surface 82 or the second surface 84 of the laminated sheet of optical effect material 80 from the first side 88 to the second side 90 of the laminated sheet of optical effect material 80 with sufficient pressure to set a curl therein. Preferably the laminated sheet of optical effect material 80 is rolled, with pressure, over the first or second surface 82 or 84 until the entire first or second surface 82 or 84 has been contacted by the surface (not shown).

It may be desired that the laminated sheet of optical effect material 80 have one or more crimps set therein rather than a curl as previously shown. FIGS. 9–11 show how a crimp, or a plurality of crimps, may be set in the laminated sheet of optical effect material 80. After a laminated sheet of optical effect material 80 has been formed by the method described and shown in FIGS. 4 and 5, the laminated sheet of optical effect material 80 may be introduced into a die which is formed to set crimps in the laminated sheet of optical effect material 80.

Shown in FIG. 9 is the laminated sheet of optical effect material 80 of FIG. 4 disposed in a die, the die 160 comprising a first die portion 162 having a first crimp forming surface 164 and a second die portion 166 having a second crimp forming surface 168. The first crimp forming surface 164 comprises a plurality of first ridges, only one of which is designated 170, and a plurality of first troughs, only one of which is designated 172. The first ridges 170 and the first troughs 172 are alternately formed along the first crimp forming surface 164 of the first die portion 164. That is, each first ridge 170 is formed between two first troughs 172 and each first trough 172 is formed between two first ridges 170.

The second crimp forming surface 168 comprises a plurality of second ridges, only one of which is designated 174, and a plurality of second troughs, only one of which is designated 176. The second ridges 174 and the second troughs 176 are alternately formed along the second crimp forming surface 168 of the second die portion 166. That is, each second ridge 174 is formed between two second troughs 180 and each second trough 176 is formed between two second ridges 174.

The first die portion 162 is selectively moveable between a retracted position (FIG. 9) and an extended position (FIG. 10). In the retracted position, the first die portion 162 is spatially separated from the second die portion 166. In the extended position, the first crimp forming surface 164 of the first die portion 162 communicates with the first or the second surface 82 or 84 of the laminated sheet of optical effect material 80, and the second crimp forming surface 168 of the second die portion 166 communicates with the opposite surface 82 or 84 of the laminated sheet of optical effect material 80. The first ridges 170 and the first troughs 172 of the first crimp forming surface 164 of the first die portion 162, and the second ridges 174 and the second troughs 176 of the second crimp forming surface 168 of the second die portion 166 are disposed such that, when the first die portion 162 is moved to the extended position, the first ridges 170 of the first crimp forming surface 164 are disposed within the second troughs 176 of the second crimp forming surface 168 and the second ridges 174 of the second crimp forming surface 168 are disposed within the first troughs 172 of the first crimp forming surface 164.

The laminated sheet of optical effect material 80 is placed between the first die portion 162 and the second die portion 166 when the first die portion 162 is in the retracted position substantially as shown in FIG. 9. When the first die portion 162 is thereafter moved to the extended position, the first crimp forming surface 164 of the first die portion 162 comes into contact with either the first or the second surface 82 or 84 of the laminated sheet of optical effect material 80, depending on whether the first surface 82 or the second surface 84 of the laminated sheet of optical effect material 80 is facing the first die portion 162 when the laminated sheet of optical effect material 80 is placed between the first die portion 162 and the second die portion 166.

As the first die portion 162 continues to extend, the laminated sheet of optical effect material 80 is crimped to conform to the shape of the first crimp forming surface 164 and the second crimp forming surface 166. Sufficient pressure is applied to the laminated sheet of optical effect material 80 so that, when the first die portion 162 is moved to the retracted position, the laminated sheet of optical effect material 80 retains the crimps after it has been removed from the die 160. This provides the crimped laminated sheet of optical effect material 178 shown in FIG. 11.

Although the method shown contemplates using a die 160 to crimp the laminated sheet of optical effect material 80, any method known in the art may be used to accomplish the same result. Additionally, it may be desirous to set only one crimp in the laminated sheet of optical effect material 80 before cutting only a portion of the laminated sheet of optical effect material 80 as described hereinafter.

After a sheet of curled or crimped laminated optical effect material having a curl or crimps set therein 20, 20a or 178 has been provided, it may then be cut to form decorative elements such as decorative grass or glitter.

Shown in FIGS. 12 and 13 is one method for cutting a curled laminated sheet of optical effect material 20 to form curled optical effect decorative grass. Although only one method is shown, any known method by which a curled laminated sheet of optical effect material 20 may be cut to form decorative grass may be utilized without departing from the spirit and scope of the present invention.

FIG. 12 shows a schematic representation of a cutting apparatus 180 which may be used to cut a curled laminated sheet of optical effect material 20 to form curled optical effect decorative grass. The cutting apparatus 180 comprises a substantially flat surface 182, a bevel 184, a first roller 186, a second roller 188 and a cutting element 190. The curled laminated sheet of optical effect material 20 is disposed under the first and second rollers 186 and 188 on the flat surface 182 of the cutting apparatus 180. Preferably, the curled laminated sheet of optical effect material 20 is disposed on the flat surface 182 of the cutting apparatus 180 in such a way that the curled laminated sheet of optical effect material curls toward the flat surface 182.

Although a first and a second roller 186 and 188 are shown, any technique may be utilized that temporarily flattens the curled laminated sheet of optical effect material 20 while it is being cut. As shown, the first and second rollers 186 and 188 are disposed above the flat surface of the cutting apparatus 180 a distance approximating the thickness of the laminated sheet of optical effect material 20. This prevents the first and second rollers 186 and 188 from placing pressure on the curled laminated sheet of optical effect material 20 which might tend to remove some of the curl from the sheet of material 20.

The cutting element 190 is selectively moveable between a retracted position, as shown in FIG. 12, and an extended position, as shown in FIG. 13. In the retracted position (FIG. 12) the cutting element 190 is spatially separated from the flat surface 182 of the cutting apparatus 180. When the cutting element 190 is in this position, the laminated sheet of optical effect material 20 is fed in direction 192 toward the bevel 184 of the cutting apparatus 180. Preferably, the first end 36 of the laminated sheet of optical effect material 20 is the leading edge of the laminated sheet of optical effect material 20 as it is fed through the cutting apparatus 180.

The first end 36 of the laminated sheet of optical effect material 20 is fed through the cutting apparatus 20 until the first end 36 extends over the bevel 184 of the cutting apparatus 180 a distance approximating the desired width of a piece of decorative grass. The cutting element 190 is then moved to the extended position (FIG. 13) wherein the cutting element 190 communicates with the bevel 184 of the cutting apparatus 180. This action severs a piece of decorative grass 194 from the sheet of optical effect material 20. Preferably, each decorative grass filament has a length ranging between 2 and 24 inches, and a width ranging between 0.02 and 0.125 inches. The cutting element 190 thereafter returns to the retracted position and the process is repeated until the entire sheet of optical effect material 20 has been cut to form several pieces of curled decorative grass 194 having an optical effect.

Figure 15:
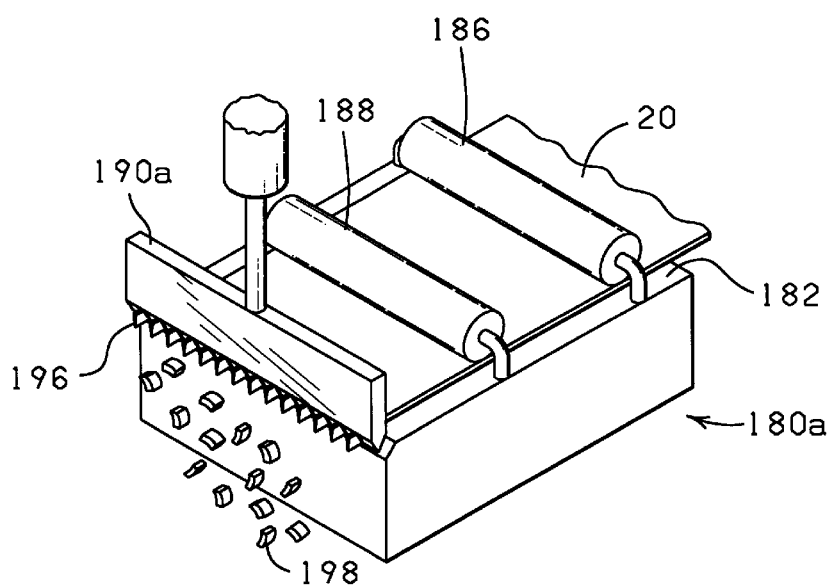
FIG. 15 is a perspective view of the curled laminated sheet of optical effect material and modified cutting apparatus of FIG. 14 showing the modified cutting element of the modified cutting machine in an extended position whereby several pieces of curled glitter are cut from the curled laminated sheet of optical effect material.

FIGS. 14 and 15 show one method for cutting a curled laminated sheet of optical effect material 20 to form curled glitter having an optical effect. Although only one method is shown, any known method by which a curled laminated sheet of optical effect material 20 may be cut to form glitter may be utilized without departing from the spirit and scope of the present invention. It should also be noted that, although the method shown in FIGS. 13 and 14 depicts a curled laminated sheet of optical effect material 20 being cut to form curled glitter having an optical effect, the method may also be used to cut the crimped laminated sheet of optical effect material 178 (FIG. 11) to form crimped glitter having an optical effect. Furthermore, although the method shown and described herein contemplates cutting a curled laminated sheet of optical effect material 20 to form curled glitter having an optical effect, it should be noted that the curled glitter having an optical effect may be formed by cutting a plurality of pieces of curled decorative grass 194 having an optical effect.

A modified cutting apparatus 180a is shown in FIGS. 14 and 15. The modified cutting apparatus 180a is similar to the cutting apparatus 180 of FIGS. 12 and 13 except that the cutting element 190a of the modified cutting apparatus 180a further comprises a plurality of cross-cut elements, only one of which is designated 196, said cross-cut elements 196 extending substantially perpendicular from the cutting element 190a.

The same process as described and shown in FIGS. 12 and 13 is followed. However, when the cutting element 190a cuts the curled laminated sheet of optical effect material 20, the cutting element 190a and the cross-cut elements 196 cut the curled laminated sheet of optical effect material 20 into small pieces of curled glitter having an optical effect, only one of which is designated 198. Preferably, each piece of glitter has a surface diameter ranging between 0.005 and 0.5 inches.

As stated hereinbefore, this method may be utilized with the crimped laminated sheet of optical effect material 178 (FIG. 11) to form crimped glitter having an optical effect. In order for this process to be effective in forming crimped glitter, however, it is desirable that, when the crimps are set in the sheet of optical effect material, the spacing between crimps is such that a crimp will be formed in each piece of glitter 198. The spacing between crimps, therefore, will be dependent on the dimensions of the cutting element 190a in relation to the cross-cut elements 196.

Changes may be made in the embodiments of the invention described herein, or in parts or elements of the embodiments described herein, or in the steps or sequence of steps of the methods described herein, without departing from the spirit and/or scope of the invention as defined in the following claims.

What is claimed is:

1. A method for forming curled iridescent decorative elements having an optical effect, the method comprising:

making a sheet of laminated material having a preset curl by the steps of:
providing a first sheet of substantially transparent material;
providing a second sheet of iridescent material having an upper iridescent surface and a lower iridescent surface, one of the first sheet of substantially transparent material and the second sheet of iridescent material having a size less than the other sheet of material;
stretching the sheet of material having a size less than the other sheet of material; and
laminating the stretched sheet of material to the non-stretched sheet of material and thereby provide the sheet of laminated material having a preset curl wherein the upper iridescent surface and the lower iridescent surface of the second sheet of iridescent material are visible and provide an optical effect; and cutting at least a portion of the sheet of laminated material having a preset curl formed therein to form curled iridescent decorative elements having an optical effect.

2. The method of claim 1 wherein the step of cutting the sheet of laminated material having a preset curl formed therein is further defined as cutting the sheet of laminated material having a preset curl formed therein into filaments having a predetermined length and width to form curled iridescent decorative grass having an optical effect.

3. The method of claim 2 wherein the step of cutting the sheet of laminated material having a preset curl formed therein into filaments having a predetermined length and width is further defined as cutting the sheet of laminated material having a preset curl formed therein into filaments having a length of from about 2 inches to about 24 inches and a width of from about 0.02 inches to about 0.125 inches.

4. The method of claim 3 wherein the first sheet of substantially transparent material is laminated to the second sheet of iridescent material with a tinted bonding material.

5. The method of claim 1 wherein the step of cutting the sheet of laminated material having a preset curl formed therein is further defined as cutting the sheet of laminated material having a preset curl formed therein to form curled iridescent glitter having an optical effect.

6. The method of claim 5 wherein the step of cutting the sheet of laminated material having a preset curl formed therein is further defined as cutting the sheet of laminated material having a preset curl therein to form curled iridescent glitter having a surface diameter ranging from about 0.005 inches to about 0.5 inches.

7. The method of claim 1 wherein the first sheet of substantially transparent material is laminated to the second sheet of iridescent material with a tinted bonding material.

8. The method of claim 2 wherein the first sheet of substantially transparent material is laminated to the second sheet of iridescent material with a tinted bonding material.

9. A method for forming iridescent decorative elements comprising:

making a sheet of laminated material having a preset distortion wherein the distortion comprises a curl, a crimp or combinations thereof, the sheet of laminated material produced by the steps of:

providing a first sheet of substantially transparent material;

providing a second sheet of iridescent material having an upper iridescent surface and a lower iridescent surface, one of the first sheet of substantially transparent material and the second sheet of iridescent material having a size less than the other sheet of material;

stretching the sheet of material having a size less than the other sheet of material; and laminating the stretched sheet of material to the non-stretched sheet of material and thereby make the sheet of laminated material having a preset curl, crimp or combinations thereof wherein the upper iridescent surface and the lower iridescent surface of the second sheet of iridescent material are visible and provide an optical effect; and cutting at least a portion of the sheet of laminated material having a preset curl, crimp or combinations thereof formed therein to form iridescent decorative elements having a preset distortion.

* * * * *

UNITED STATES PATENT AND TRADEMARK OFFICE
CERTIFICATE OF CORRECTION

PATENT NO.   : 5,891,286
DATED        : April 6, 1999
INVENTOR(S)  : Donald E. Weder It is certified that error appears in the above-identified patent and that said Letters Patent is hereby corrected as shown below:

<u>Drawings</u>,
Fig. 12, delete "36" and substitute therefor -- 32 --.

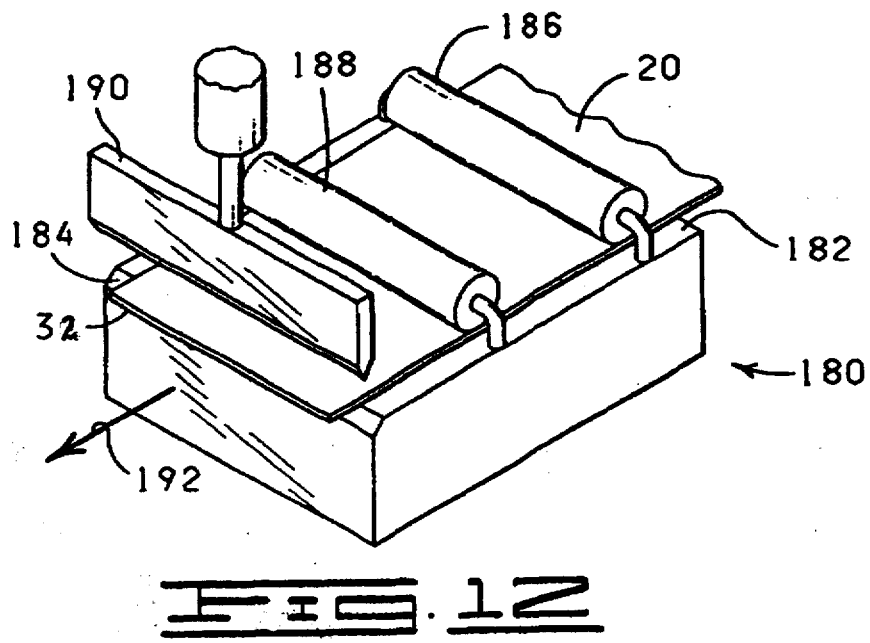

Fig. 12

UNITED STATES PATENT AND TRADEMARK OFFICE
CERTIFICATE OF CORRECTION

PATENT NO. : 5,891,286
DATED : April 6, 1999
INVENTOR(S) : Donald E. Weder

It is certified that error appears in the above-identified patent and that said Letters Patent is hereby corrected as shown below:

Fig. 13, insert the numeral -- 184 -- and its associated lead line.

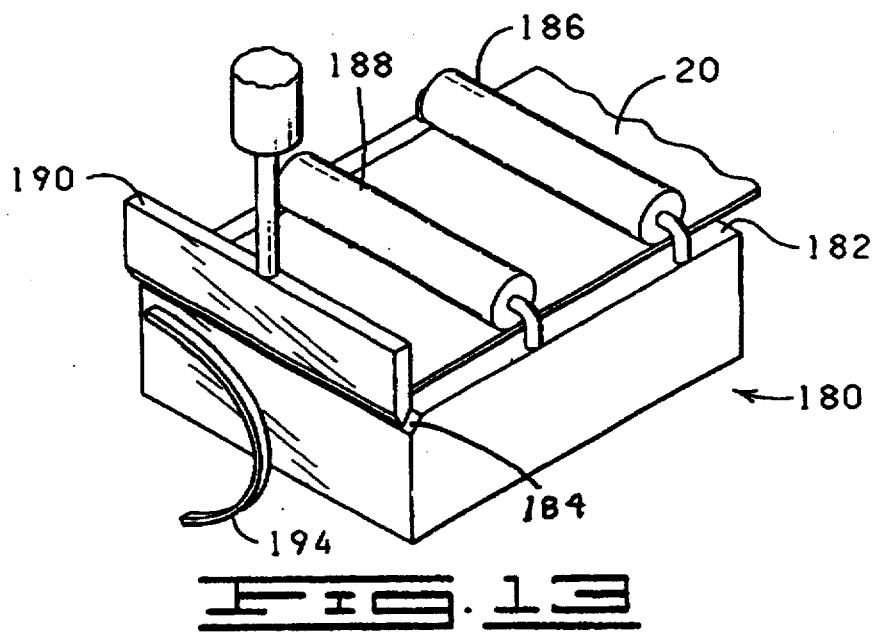

UNITED STATES PATENT AND TRADEMARK OFFICE
CERTIFICATE OF CORRECTION

PATENT NO. : 5,891,286
DATED : April 6, 1999
INVENTOR(S) : Donald E. Weder

It is certified that error appears in the above-identified patent and that said Letters Patent is hereby corrected as shown below:

Fig. 14, delete "36" and substitute therefor -- 32 --.

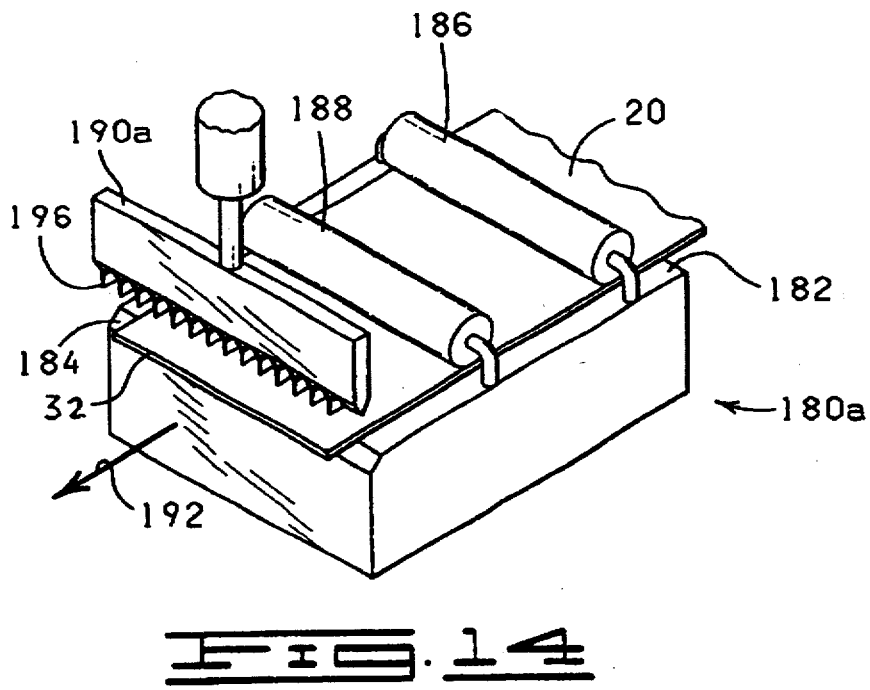

FIG. 14

UNITED STATES PATENT AND TRADEMARK OFFICE
CERTIFICATE OF CORRECTION

PATENT NO. : 5,891,286
DATED : April 6, 1999
INVENTOR(S) : Donald E. Weder

It is certified that error appears in the above-identified patent and that said Letters Patent is hereby corrected as shown below:

Fig. 15, insert the numeral -- 184 -- and its associated lead line.

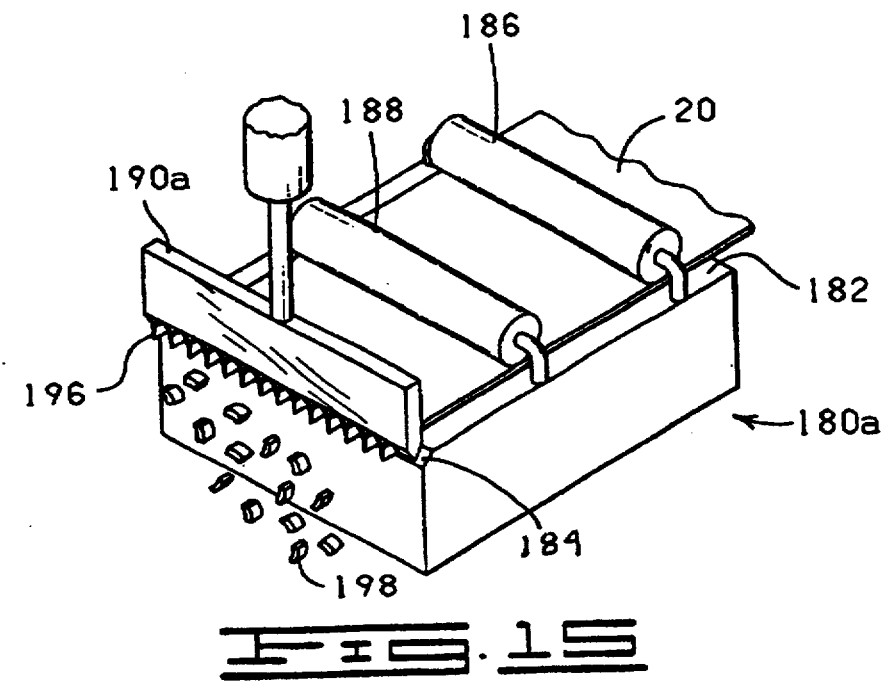

UNITED STATES PATENT AND TRADEMARK OFFICE
CERTIFICATE OF CORRECTION

PATENT NO. : 5,891,286
DATED : April 6, 1999
INVENTOR(S) : Donald E. Weder

It is certified that error appears in the above-identified patent and that said Letters Patent is hereby corrected as shown below:

Column 4,
Line 44, delete "film is" and substitute -- film as -- therefor;

Column 5,
Line 12, delete "surface 64" and substitute -- surface 62 -- therefor;
Line 19, delete "(FIG. 3)" and substitute -- (FIG. 2) -- therefor;
Line 58, delete "width 90" and substitute therefor -- width 98 --;
Line 59, delete "ends 90" and substitute -- ends 92 -- therefor;
Line 60, delete "92" and substitute -- 94 -- therefor;

Column 6,
Line 13, delete "length 136" and substitute -- length 138 -- therefor;
Line 14, delete "width 138," and substitute -- width 136, -- therefor;
Line 14, delete "length 136" and substitute -- length 138 -- therefor;
Line 16, delete "width 138," and substitute -- width 136, -- therefor;
Line 28, delete "136" and substitute -- 138 -- therefor;
Line 29, delete "138" and substitute -- 136 -- therefor;

Column 8,
Line 51, after "material" insert -- 20, 20a or 178 -- and after "therein" delete "20, 20a or 178";

UNITED STATES PATENT AND TRADEMARK OFFICE
CERTIFICATE OF CORRECTION

PATENT NO.   : 5,891,286
DATED        : April 6, 1999
INVENTOR(S)  : Donald E. Weder It is certified that error appears in the above-identified patent and that said Letters Patent is hereby corrected as shown below:

<u>Column 9,</u>
Line 27, delete "first end 36" and substitute -- first end 32 -- therefor;
Line 30, delete "first end 36" and substitute -- first end 32 -- therefor;
Line 31, delete "cutting apparatus 20" and substitute -- cutting apparatus 180 -- therefor;
Line 32, delete "first end 36" and substitute -- first end 32 -- therefor;
Line 41, delete "inches." and substitute -- inch. -- therefor;

Signed and Sealed this

Fifth Day of February, 2002

*Attest:*

JAMES E. ROGAN
*Attesting Officer*   *Director of the United States Patent and Trademark Office*

UNITED STATES PATENT AND TRADEMARK OFFICE
CERTIFICATE OF CORRECTION

PATENT NO.    : 5,891,286
DATED         : April 6, 1999
INVENTOR(S)   : Donald E. Weder It is certified that error appears in the above-identified patent and that said Letters Patent is hereby corrected as shown below:

<u>Title page,</u>
Item [56], References Cited, U.S. PATENT DOCUMENTS, delete the numeral "31,780", and substitute therefor the numeral -- Re. 31,780 --. Delete "12/1861", substitute -- 12/1984 --.
Item [56], References Cited, FOREIGN PATENT DOCUMENTS, delete "1166697" and substitute therefore the numeral -- 1166692 .

UNITED STATES PATENT AND TRADEMARK OFFICE
CERTIFICATE OF CORRECTION

PATENT NO. : 5,891,286
DATED : April 6, 1999
INVENTOR(S) : Donald E. Weder

It is certified that error appears in the above-identified patent and that said Letters Patent is hereby corrected as shown below:

Drawings,
Fig. 12, delete "36" and substitute therefor -- 32 --.

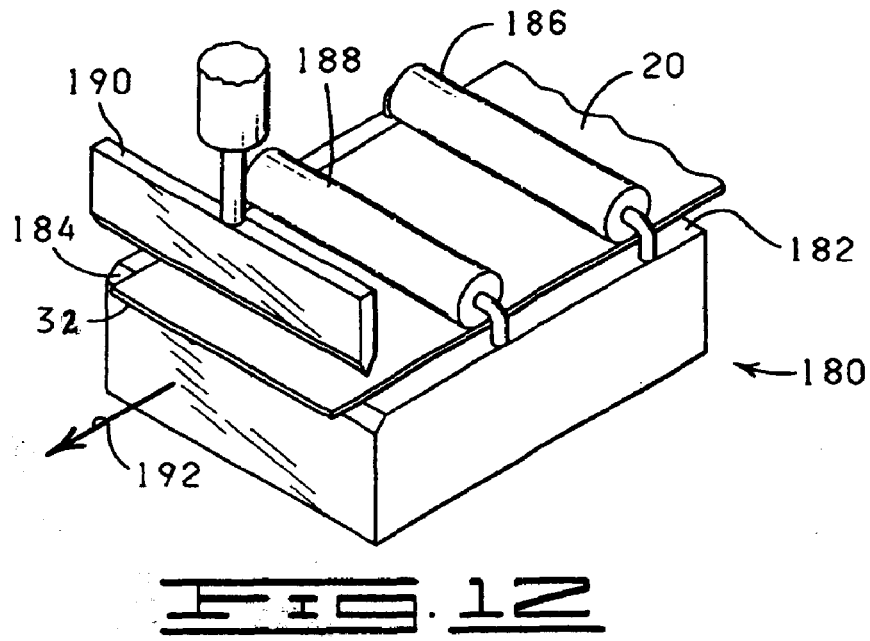

UNITED STATES PATENT AND TRADEMARK OFFICE
CERTIFICATE OF CORRECTION

PATENT NO.    : 5,891,286
DATED         : April 6, 1999
INVENTOR(S)   : Donald E. Weder It is certified that error appears in the above-identified patent and that said Letters Patent is hereby corrected as shown below:

Fig. 13, insert the numeral -- 184 -- and its associated lead line.

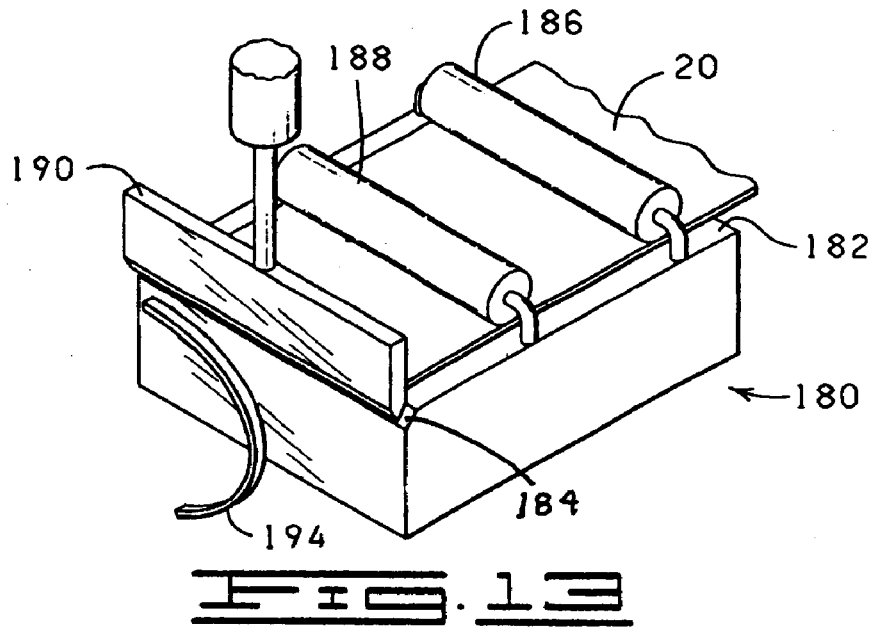

UNITED STATES PATENT AND TRADEMARK OFFICE
CERTIFICATE OF CORRECTION

PATENT NO.    : 5,891,286
DATED         : April 6, 1999
INVENTOR(S)   : Donald E. Weder It is certified that error appears in the above-identified patent and that said Letters Patent is hereby corrected as shown below:

Fig. 14, delete "36" and substitute therefor -- 32 --.

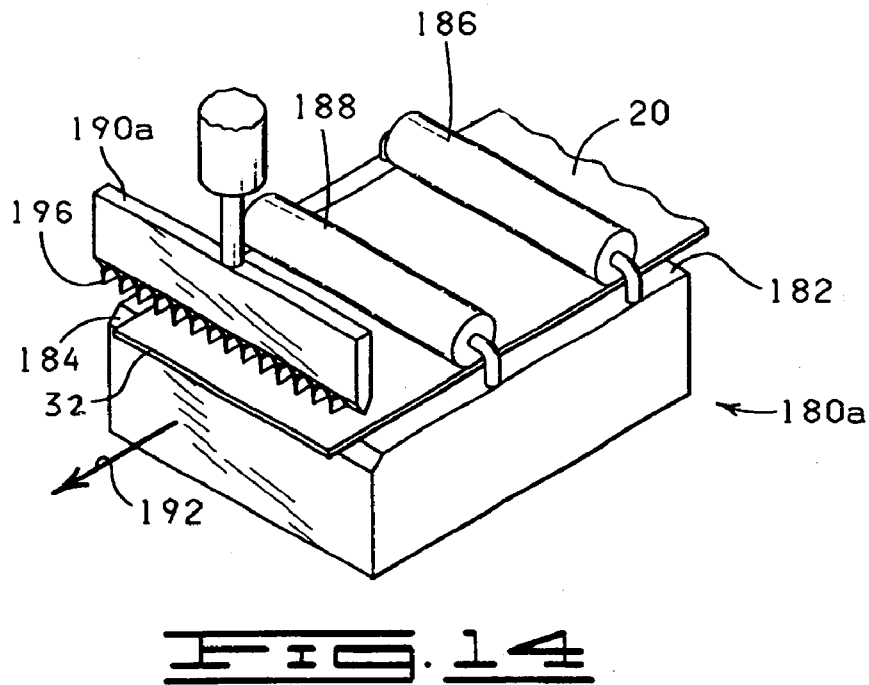

UNITED STATES PATENT AND TRADEMARK OFFICE
CERTIFICATE OF CORRECTION

PATENT NO. : 5,891,286
DATED : April 6, 1999
INVENTOR(S) : Donald E. Weder

It is certified that error appears in the above-identified patent and that said Letters Patent is hereby corrected as shown below:

Fig. 15, insert the numeral -- 184 -- and its associated lead line.

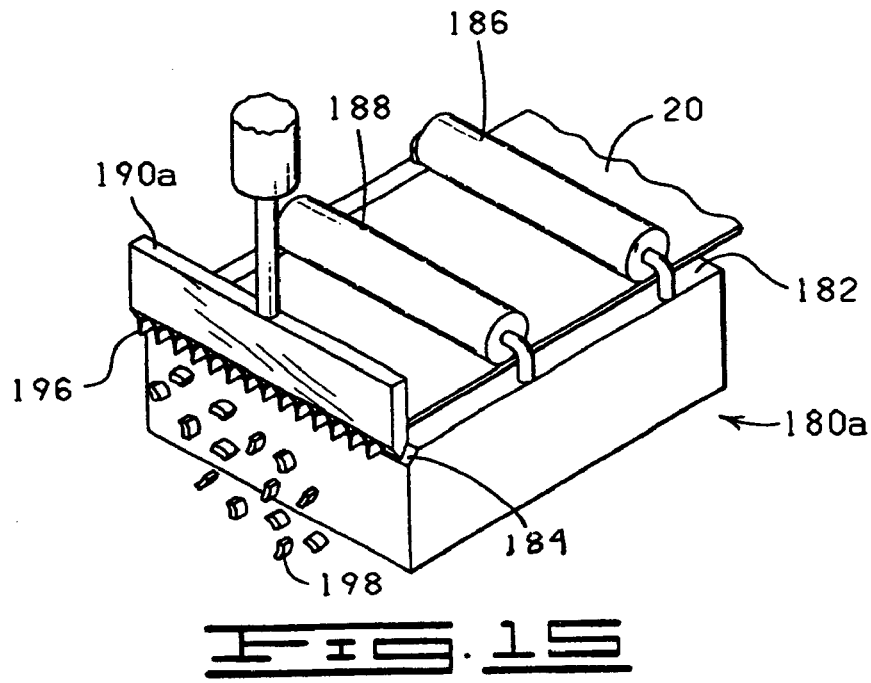

UNITED STATES PATENT AND TRADEMARK OFFICE
CERTIFICATE OF CORRECTION

PATENT NO.    : 5,891,286
DATED         : April 6, 1999
INVENTOR(S)   : Donald E. Weder It is certified that error appears in the above-identified patent and that said Letters Patent is hereby corrected as shown below:

Column 4,
Line 44, delete "film is" and substitute -- film as -- therefor;

Column 5,
Line 12, delete "surface 64" and substitute -- surface 62 -- therefor;
Line 19, delete "(FIG. 3)" and substitute -- (FIG. 2) -- therefor;
Line 58, delete "width 90" and substitute therefor -- width 98 --;
Line 59, delete "ends 90" and substitute -- ends 92 -- therefor;
Line 60, delete "92" and substitute -- 94 -- therefor;

Column 6,
Line 13, delete "length 136" and substitute -- length 138 -- therefor;
Line 14, delete "width 138," and substitute -- width 136, -- therefor;
Line 14, delete "length 136" and substitute -- length 138 -- therefor;
Line 16, delete "width 138," and substitute -- width 136, -- therefor;
Line 28, delete "136" and substitute -- 138 -- therefor;
Line 29, delete "138" and substitute -- 136 -- therefor;

Column 8,
Line 51, after "material" insert -- 20, 20a or 178 -- and after "therein" delete "20, 20a or 178";

UNITED STATES PATENT AND TRADEMARK OFFICE
CERTIFICATE OF CORRECTION

PATENT NO.    : 5,891,286
DATED         : April 6, 1999
INVENTOR(S)   : Donald E. Weder It is certified that error appears in the above-identified patent and that said Letters Patent is hereby corrected as shown below:

<u>Column 9,</u>
Line 27, delete "first end 36" and substitute -- first end 32 -- therefor;
Line 30, delete "first end 36" and substitute -- first end 32 -- therefor;
Line 31, delete "cutting apparatus 20" and substitute -- cutting apparatus 180 -- therefor;
Line 32, delete "first end 36" and substitute -- first end 32 -- therefor;
Line 41, delete "inches." and substitute -- inch. -- therefor;

This certificate supersedes Certificate of Correction issued February 5, 2002.

Signed and Sealed this

Fourteenth Day of January, 2003

*Attest:*

JAMES E. ROGAN
*Director of the United States Patent and Trademark Office*

*Attesting Officer*